United States Patent

[11] 3,599,178

[72] Inventors David G. Jackson
Los Altos;
Bernie F. Jackson, Cupertino, both of, Calif.

[21] Appl. No. 809,323
[22] Filed Mar. 21, 1969
[45] Patented Aug. 10, 1971
[73] Assignee Singer-General Precision, Inc.
Binghamton, N.Y.

[54] METHOD OF STORING INFORMATION ON AND RETRIEVING INFORMATION FROM A MAGNETIC DRUM
5 Claims, 11 Drawing Figs.

[52] U.S. Cl. .......... 340/172.5, 340/174.1 G
[51] Int. Cl. .......... G11b 5/00
[50] Field of Search .......... 340/172.5, 174.1; 235/157

[56] References Cited
UNITED STATES PATENTS
3,427,596 2/1969 Hertz .......... 340/172.5
OTHER REFERENCES
Svigals, J., Nonsymmetrical Recording Technique, IBM Technical Disclosure Bulletin, Vol. 9, No. 7, December, 1966, p. 778

*Primary Examiner*—Raulfe B. Zache
*Attorneys*—Francis L. Masselle and Willaim Grobman ABSTRACT: The disclosed embodiment of the present invention is a method of storing pictorial information on and retrieving pictorial information from a movable storage media to permit rapid access and retrieval of such information for displaying either the whole or a submultiple of the whole of the pictorial information in a minimum of time. The disclosed method comprises writing blocks of such information on a magnetic drum, with each block being formed of one or more lines of the scanned information. The blocks are arranged in step fashion on the drum with each successive block being spaced along the direction of travel of the drum a distance equal to the line length of the smallest picture to be displayed. In the disclosed embodiment, each block is formed of four scan lines written in 16-bit parallel format on the drum, and the spacing of each block is equal to the distance occupied by one-fourth of a scan line of information. Since the scanned information is greater than the displayed information, that portion of the information which is to be displayed is read from the drum, compressed by means of logic circuits, and supplied to a display storage. The information in the display storage is continuously read and supplied to a CRT for display to an operator.

INVENTORS
DAVID G. JACKSON
BERNIE F. JACKSON
BY

INVENTORS
DAVID G. JACKSON
BY BERNIE F. JACKSON

INVENTORS
DAVID G. JACKSON
BERNIE F. JACKSON
BY

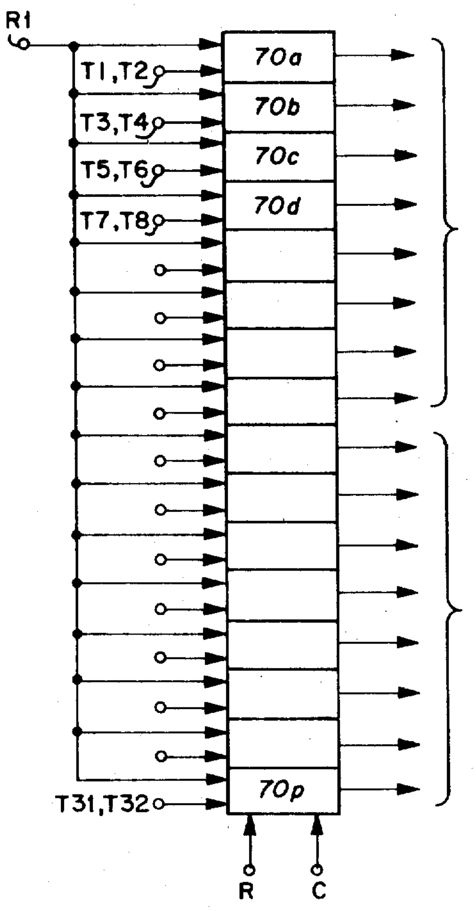
Fig_8
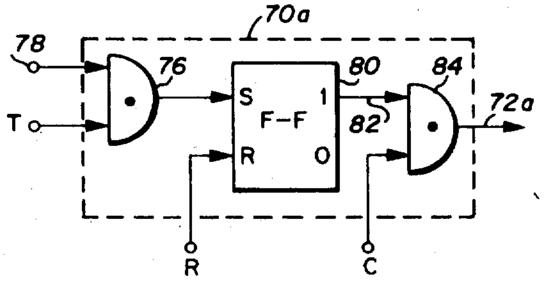
Fig_9
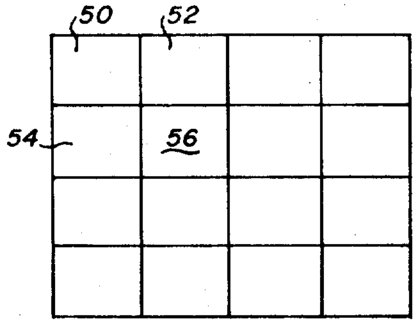
Fig_11
| | | | |
|---|---|---|---|
| LINE 0 | LINE 2 | LINE 4 | LINE 6 |
| LINE 256 | LINE 258 | LINE 260 | LINE 262 |
| LINE 1 | LINE 3 | LINE 5 | LINE 7 |
| LINE 257 | LINE 259 | LINE 261 | LINE 263 |
Fig_10
INVENTORS
DAVID G. JACKSON
BERNIE F. JACKSON
BY

METHOD OF STORING INFORMATION ON AND RETRIEVING INFORMATION FROM A MAGNETIC DRUM

This invention relates generally to a method of storing information on a movable storage media and more particularly to an information storage and retrieval method for a display system which permits rapid construction of a partial display of the entire sore of information.

Selective mapping of information on a magnetic drum to permit rapid access and retrieval has been employed in the past. However, these prior arrangements usually position the most obvious information to be read successively in serially adjacent areas on the storage media. That is, if pictorial information is to be stored on a magnetic drum, successive scan lines are mapped serially around the periphery of the drum. Such mapping of pictorial information, however, does not permit rapid access and retrieval when either the whole of the pictorial information or a submultiple of the whole of the pictorial information is to be displayed to an operator.

If it is desired to display a portion of the entire pictorial information, for example, one-fourth of the total pictorial information, only one-half of the information of each scan line is required to be read. If pictorial information is written in serial fashion around the periphery of a drum, each scan line of information must be completely traversed across its entire length before a subsequent scan line can be read. Consequently, during a display mode in which one-fourth of the total picture is displayed, for example, useful information is retrieved only during one-half of the total time.

Accordingly, the present invention provides a novel arrangement for mapping pictorial information on a storage media which permits more rapid access and retrieval thereof than prior known mapping arrangements. Generally, the method of the present invention comprises the steps of recording at least a first line of the information along at least one track of the storage media, and recording a subsequent line of the information a long another track of the storage media which is spaced along the path of travel of the storage media from the beginning of the recording of the first line by a distance occupied by the number of elements of information corresponding to the line length of the smallest picture to be displayed.

Accordingly, it is an object of the present invention to provide a method of mapping pictorial information on a storage media which permits relatively rapid access and retrieval thereof for displaying submultiples of the total picture content.

A feature of the present invention resides in the provision of information blocks which are mapped in stepped fashion on a magnetic drum, such that the first portion of each block corresponding to the length of a step can be read from the drum during 1 revolution thereof.

These and other objects, features and advantages of the present invention will be more fully realized and understood from the following detailed description when taken in conjunction with the accompanying drawings, wherein:

FIG. 8 is a block diagram of the reformat register illustrated in FIGS. 6 and 7 with the input circuit thereof arranged for being employed with the circuit illustrated in FIG. 5, but in another mode of operation;

FIG. 9 is a block diagram of one of the stages of the reformat register illustrated in FIGs. 6, 7 and 8;

FIG. 10 is a map of the pictorial information recorded on the display storage illustrated in FIG. 1; and FIG. 11 is a representation of the areas of a pictorial image which can be rapidly displayed to an operator by employing the principles of the present invention in conjunction with the display system illustrated, in FIG. 1.

Like reference numerals throughout the various views of the drawings are intended to designate the same or similar structures.

Figure 1:
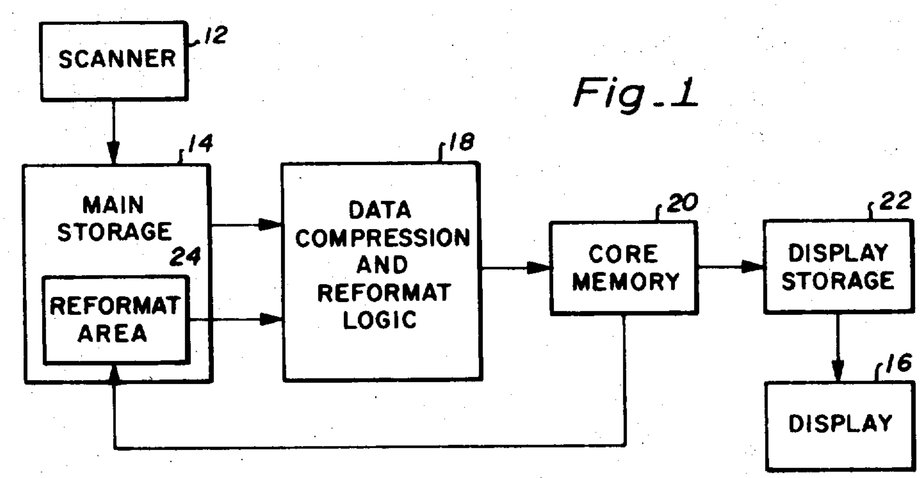
FIG. 1 is a block diagram of a display system in which the method of the present invention may be employed.

With reference to FIG. 1, there is shown a display system in which the method of the present invention may be practiced. A scanner station 12 scans a document such as a microfilm aperture card or the like and supplies a video signal to a main storage unit 14. Preferably, the main storage unit 14 is formed of a magnetic drum. The video signal supplied by the scanner 12 is in the form of a serial string of information bits and the main storage unit 14 includes reformat circuitry for converting the serial string of information into 16-bit parallel format. When all of the pictorial information is written into storage, it is available for retrieval and display to an operator.

In a typical application of the displays system illustrated in FIG. 1, a microfilm aperture card is employed which contains pictorial information, such as line drawings, with the microfilm image being approximately 24 million bits of data representing the image in the form of a video signal. More specifically, the video signal is formed of 4,096 lines of information each containing 6,144 bits of information. A display unit 16 for displaying the pictorial information to an operator consists of a television type scan of 512×768 lines. Accordingly, it is necessary to either quickly select 512×768 bits of information out of the 24 million bits in the main storage 14 for display on the display unit 16 or to compress a portion or all of the 24 million bits of information in the main storage unit for display in the display unit 16. Since acceptable selection time of this information from the main storage unit 14 is in the order of approximately 0.5 second, the data storage layout within the storage unit 14 is of critical importance.

A data compression and reformat logic circuit 18, which is under the control of the operator selects and compresses the data which is to be displayed by means of the display unit 16. The selected data is supplied to a core memory 20 which acts as a buffer in the transmission of information. The information in the core memory 20 is supplied to a display storage unit 22 from which the information is continuously read and supplied as a video signal to the display unit 16. In one mode of operation it is necessary to supply information stored in the core memory 20 to a reformat area 24 on the magnetic drum in the main storage unit 14 where such information is partially reformatted and supplied through the data compression and reformat logic circuit 18 and the core memory 20 to the display storage unit 22.

In a specific application of the display system illustrated in FIG. 1, the system has three modes of operation: namely, display of any one-sixteenth of the microfilmed image, display of any one-fourth of the microfilmed image, and display of the total microfilm image.

FIG. 11 illustrates a representation of the areas of the microfilmed image which can be displayed during the one-sixteenth mode of operation. During the one-fourth mode of operation of the display system, any one of the four areas in each of the four quadrants of the representation illustrated in FIG. 11 can be displayed.

If the display system is set in a mode to display, for example, one-fourth of the microfilmed image, the only information which is required to be read from the main storage unit 14 is one-half of the total lines of the pictorial information and one-half of the data elements from each of those lines. If successive scan lines of the pictorial information are mapped serially around the periphery of the magnetic drum in the main storage unit 14, useful information would be retrieved therefrom only during one-half of the total read time. The present invention substantially reduces the amount of time required to retrieve such information from the main storage unit 14 by mapping the information on the magnetic drum in a novel and unique arrangement. Such arrangement is illustrated in FIG. 2 of the drawings.

Figure 2:
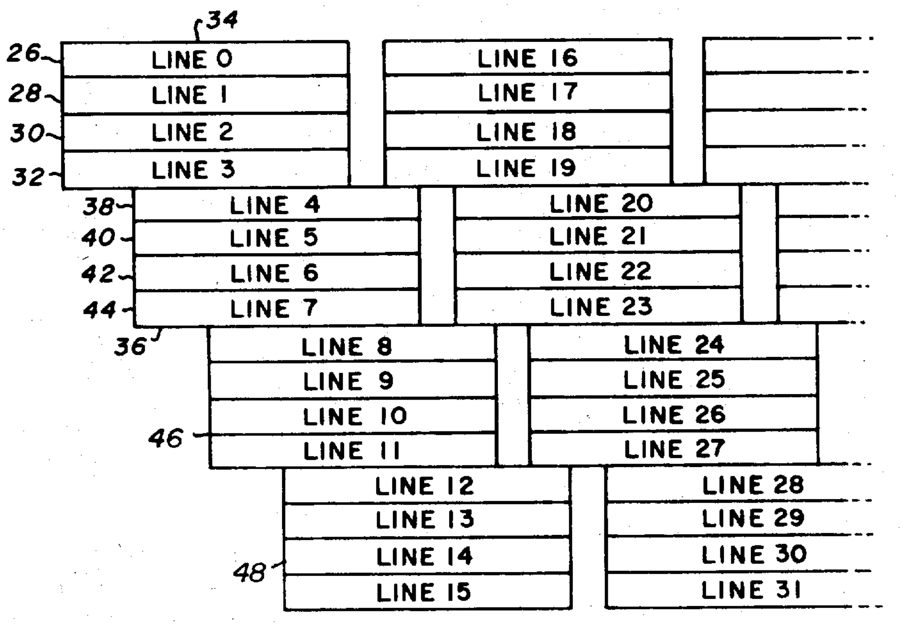
FIG. 2 is a map of information recorded on a storage media, which information is arranged in accordance with the principles of the present invention.

As shown in FIG. 2, the video information derived from scanning the first of four lines of the microfilmed image is recorded on tracks 26, 28, 30 and 32 to form a block of information designated with the reference numeral 34. Each scan line is recorded in 4-bit parallel format, with the result that each block of information is recorded in 16-bit parallel format. A subsequent block of scanned information which is formed of scan lines 4, 5, 6 and 7 is recorded on tracks 38, 40, 42 and 44 of the magnetic drum. Similarly, blocks 46 and 48 are each formed of information derived from subsequent scan lines. The blocks 34, 36, 46 and 48 are spaced along the path of travel of the magnetic drum from one another by a distance occupied by one-fourth of a line of information plus a relatively small gap to permit switching from reading one block to reading a subsequent block.

Figure 3:
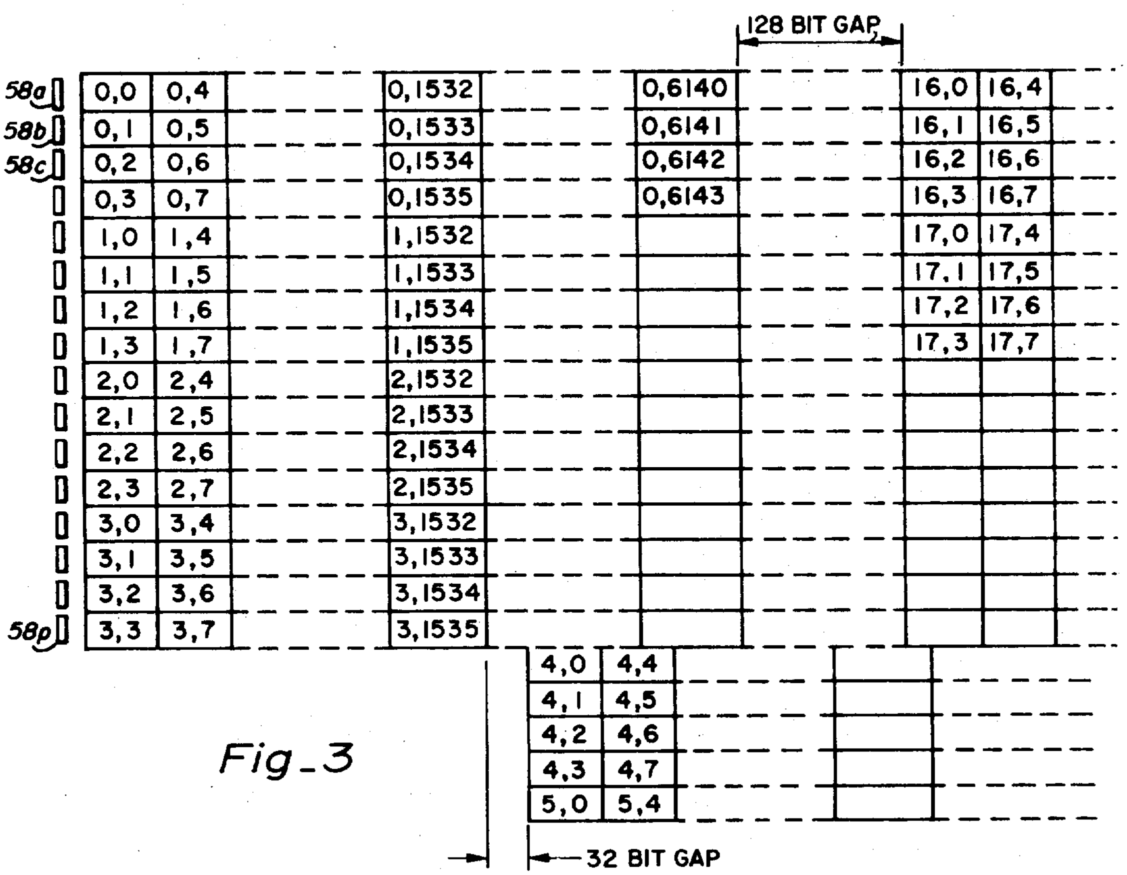
FIG. 3 is an enlarged representation of a portion of the map illustrated in FIG. 2.

If the display system illustrated in FIG. 1 is programmed to display one-sixteenth of the microfilm image, the mapping arrangement illustrated in FIG. 2 permits rapid access to any one-fourth line segment without any loss of time between the retrieval of information from one block and the retrieval of information from another block. FIG. 3 illustrates in greater detail the upper left-hand corner of the recorded information illustrated in FIG. 2.

If, for example, it is desired to display the area designated with the reference numeral 50 in FIG. 11, which constitutes one-sixteenth of the total image, it is necessary to retrieve from the main storage unit 14 the first one-fourth of each of the first 1,024 lines recorded therein. Accordingly, after the first one-fourth of the block 34 is read, the magnetic drum is in a position to permit retrieval of the information from block 36. Similarly, after the first one-fourth of block 36 is read from storage, the magnetic drum is in a position to permit retrieval of information from the block 46.

If it is desired to display one-fourth of the microfilmed image, for example, that portion represented by the areas 50, 52, 54 and 56 in FIG. 11, it becomes necessary to scan the first one-half of each of the first 2,048 lines of the scanned image. For this example, after the first half of block 34 is read, the magnetic drum is in a position to permit retrieval of the information in block 46. If an interlace display system is employed, the information retrieved from blocks 34 and 46 form successive lines of one field of the display which is obtained during 1 revolution of the magnetic drum. On a second revolution of the magnetic drum, the first half of blocks 36, 48, etc. are read to construct the second field of the displayed image.

If it is desired to display the total microfilm image, 4 revolutions of the magnetic drum are required. In each of the above described modes, however, there is no lost time during retrieval in which information must be traversed which is not required for the desired display.

As shown in FIG. 3 of the drawings, the information is stored on the magnetic drum in 16-bit parallel format to form each information block. Each successive block of information is spaced from the preceding block along the path of travel of the drum by a distance equal to the distance occupied by 384 bits which correspond to the space occupied by one-fourth of a line of information plus a 32-bit gap for permitting switching from one block of information to another block of information. Accordingly, successive blocks of information recorded on the same tracks on the magnetic drum are spaced from one another by a 128bit gap, such that a 32-bit gap exists between the end of each one-fourth of each block and the beginning of a succeeding block of information.

Since the present invention is a method of storing information on and retrieving information from a storage media to construct a unique mapping arrangement of such information on the drum, a description of the particular mechanics involved in reformatting the video information derived from the scanner 12 is not necessary for a complete understanding of the invention and is well within the purview of one skilled in the art. However, in order to understand properly the usefulness of the mapping arrangement of the present invention, a simplified explanation will be made of the more important function of the data compression and reformat logic 18 illustrated in FIG. 1.

Figure 4:
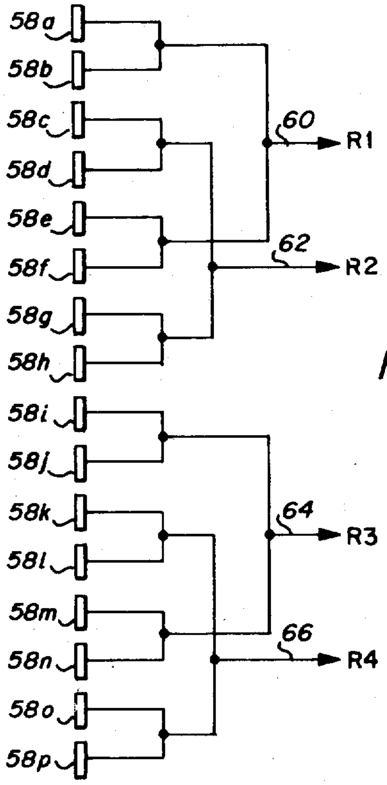
fig. 4 is a partial block and partial schematic diagram of a portion of the data compression and reformat logic illustrated in FIG. 1 for one mode of operation of the display system.

With reference to FIGS. 3 and 4, a plurality of read-write heads 58*a*—*p* are employed for writing information on and reading information from the main storage unit 14. As previously stated, the number of information bits corresponding to one microfilmed image which are stored on the magnetic drum of the main storage unit 14 are considerably greater than the number of bits employed to construct a display to an operator. If a full frame is to be displayed to the operator, data compression of 64 to 1 must be employed. A quarter picture display requires data compression of 4 to 1. Accordingly, during the one-fourth picture display mode, four immediately adjacent bits are combined to produce a single information bit for display. As shown in FIG. 3, each information bit is designated with two numbers, the first of which corresponds to the scan line number, and the second of which corresponds to the position of the bit in the corresponding line. Information bits (0,0), (0,1), (1,0), and (1,1) correspond to immediately adjacent areas on the microfilmed image. Accordingly, these information bits are combined by connecting the outputs of read heads 58*a*, 58*b*, 58*e*, and 58*f* together to provide an output on a line 60. Accordingly, if any of these information bits contain a "1," the output on the line 60 will be a "1." However, only if all of these information bits are a "0" will the output on the line 60 be a "0." Accordingly, during the one-sixteenth of picture mode of operation, the first output to appear on the line 60 will constitute the first bit of information of the first line to be displayed.

The second bit of information of the first line which is to be displayed is formed by combining the bits (0,2), (0.3), (1,2), and (1,3). Therefore, by connecting the outputs of read heads 58*c*, 58*d*, 58*g* and 58*h* together an output will be provided on a line 62 which corresponds to the combined information contained in these bits. In practice, this combination of bits of information or compression is performed by "OR" gates which are schematically represented by the connection of the outputs of the read heads to one another.

The output of read heads 58*i*—*p* are connected in a similar manner to provide outputs on lines 64 and 66. The initial outputs from lines 64 and 66 form the bits of information which constitute the second line of the ultimate display. Since an interlace system is employed in the display, the initial information provided on the lines 60 and 62 forms the first line of a first field of the display and the initial information provided on the lines 64 and 66 provide the first line of a second field of the display.

The second line of each field of the display during the one-sixteenth picture display mode will be derived from the outputs of the read heads (not shown) associated with tracks 38, 40, 42, and 44 of the magnetic drum. The information from each block is combined in the same fashion as described hereinabove for the information in block 34.

Figures 5, 6, 7:
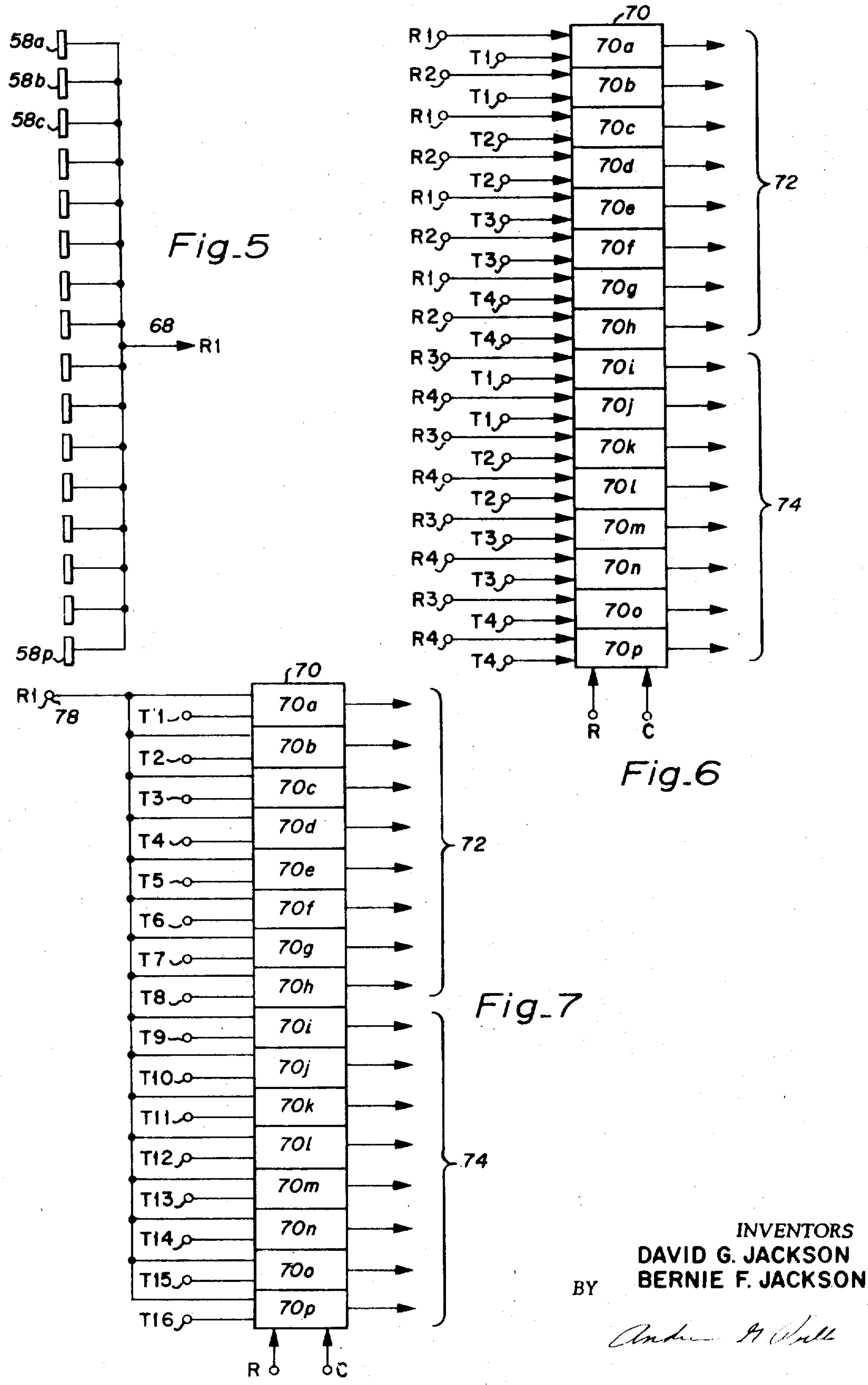
FIG. 5 is a partial block and a partial schematic diagram of the data compression and reformat logic illustrated in FIG. 4 for another mode of operation of the display system.
FIG. 6 is a block diagram of another portion of the data compression and reformat logic illustrated in FIG. 1 which is employed in combination with the circuit illustrated in FIG. 4.
FIG. 7 is a block diagram of the reformat register illustrated in FIG. 6 with the input circuit arranged to be employed with the circuit illustrated in FIG. 5 for one mode of operation.

During the one-quarter picture display mode of operation and the full picture display mode of operation, the outputs of all of the read heads 58*a*—*p* are connected together as shown in FIG. 5 to form an output on a line 68. The "OR" function provided by connecting the outputs of all of the read heads 58*a*—*p* together provides a compression of 16 to 1 by combining 16 immediately adjacent information bits to form a single information bit for display. During the one-quarter picture display mode of operation, the first 768 bits of information appearing on the line 68 form the first line of the first field of the display. When one-half of the block of information which forms the first line of the first field has been read, the magnetic drum is in a position to read the information from a subsequent block which forms the second line of the first field of the display. As a result, during the one-quarter picture display mode of operation, the first field of the display is constructed during 1 revolution of the magnetic drum and the second field of the display is generated during the second revolution of the magnetic drum. The circuit illustrated in FIG. 5 is also employed during the full picture display mode of operation, but the total compression of the information is not performed therein. Since the compression ratio provided by the circuit illustrated in FIG. 5 is 16 to 1, and a compression ratio of 64 to 1 is required for the full picture display mode of operation, an additional 4 to 1 compression of the information appearing on the line 68 is required.

The information derived from the circuits illustrated in FIGS. 4 and 5 must be reformatted before being supplied to the core memory 20 and the display storage unit 22. For the one-sixteenth picture display mode of operation, the circuit arrangement illustrated in FIG. 6 is employed for reformatting the data delivered on lines 60, 62, 64 and 66 of FIG. 4. A reformat register 70 which is formed of stages 70*a—p* is connected to respective outputs of the circuit illustrated in FIG. 4 and to respective outputs of a decoder (not shown). In particular, the terminals designated R1 are connected to line 60, the terminals designated R2 are connected to line 62, the terminals designated R3 are connected to line 64, and the terminals designated R4 are connected to line 66. The terminals designated T1, T2, T3 and T4 are connected to respective outputs of a decoder (not shown) to control the entry information from the lines R1—4 into the register stages 70*a—p*. The decoder provides a 4-count cycle which generates a gating pulse during the first count on the terminals T1, a gating pulse during the second count on the terminals T2, a gating pulse during the third count on the terminals T3, and a gating pulse during the fourth count on the terminals T4.

FIG. 9 illustrates in block diagram form the structure of a typical one of the stages 70*a—p*. As shown therein, an "AND" gate 76 is provided with a pair of inputs, one of which is connected to an input terminal 78 which is disposed for receiving digital bits of information thereon, and the other of which is connected to a terminal T which is disposed for receiving a binary word or gating pulse thereon from a decoder. When the "AND" gate 76 is enabled by the existence of a gating pulse on the terminal T, the binary information appearing at the terminal 78 will be gated to the "SET" terminal of a flip-flop 80. If a "1" bit appears at the input terminal 78 when the "AND" gate 76 is enabled, the state of the flip-flop 80 will be changed to provide a "1" output on a line 82. If, however, a "0" bit appears at the terminal 78 when the "AND" gate 76 is enabled, the state of the flip-flop 80 will remain unchanged and a "0" will appear on the line 82. The line 82 is connected to one input of an "AND" gate 84 having another input thereof connected to a terminal C which is disposed for receiving a clock pulse thereon.

Upon the occurrence of a clock pulse at the terminal C, the information on the line 82 is gated to a line 72*a*. After the information contained in the stage 70*a* is gated to the output line 72*a*, a reset pulse is supplied to a terminal R which resets the flip-flop 80 to its initial state.

Therefore, by the time sequenced application of gating pulses to the terminals T1—4, information is transferred into the register 70. When the register 70 has been filled with information, a clock pulse supplied to the terminal C simultaneously gates all of the information contained therein onto output lines 72 and 74. After the information contained in register 70 is gated to the output lines 72 and 74, a reset pulse is supplied to the terminal R which resets each of the stages 70*a—p* to their initial state in readiness to receive additional information. In actual practice, two reformat registers 70 are employed, such that information can be supplied to one while information is being removed from the other.

At the beginning of a particular retrieval operation, the initial information appearing on the output lines 72 constitutes the first eight bits of the first line of the first field of the display and the initial information appearing on the output lines 74 constitutes the first 8 bits of the first line of the second field of the display. The information appearing on lines 72 and 74 is supplied to the core memory 20 where it is buffered and transferred to the display storage 22 and written therein in 8-bit parallel in the format illustrated in FIG. 10.

As previously mentioned, during the one-quarter picture display mode of operation and the full picture display mode of operation, the output circuit for the read heads 58 is as shown in FIG. 5. During the one-quarter picture display mode of operation, the input circuit for the register 70 is as shown in FIG. 7. As shown therein, one input terminal of each of the stages 70*a—p* is connected to the terminal 78 which is disposed for receiving digital information from the line 68 (see FIG. 5). The other input terminal of each of the stages 70*a—p* is connected to a respective output of a decoder (not shown), such that the first bit of information appearing at the terminal 78 is transferred into the stage 70*a*, the second bit of information is transferred into the stage 70*b*, the third bit of information is transferred into the stage 70*c*, etc. In this mode of operation, the decoder provides a 16 count cycle for entering information into the stages 70*a—p* in sequential order.

At the beginning of a particular retrieval operation, the first digital word supplied on the output lines 72 constitutes the first 8 bits of the first line of the first field of the display and the initial digital word supplied on the output lines 74 constitutes the second 8 bits of the first line of the first field of the display.

As previously mentioned, during the one-quarter picture display mode of operation, one-half of each line length of the first four scan lines is sensed to develop the first line of the first field of the display. After the first half of the first four scan lines are traversed, the magnetic drum is in a position to permit retrieval of the information from block 46, which information is compressed to form the second line of the first field of the display. Therefore, the first field of the display is developed during a first revolution of the magnetic drum and a second field of the display is developed during a second revolution of the drum by sensing information blocks 36 and 48.

During the full picture display mode of operation, the input circuit to the reformat register 70 is changed from that shown in FIGS. 6 and 7 to that shown in FIG. 8. Digital information is supplied to the terminal 78 which is connected to one input of each of the register stages 70*a—p*. The other inputs of the stages 70*a—p* are connected to respective pairs of outputs from the decoder (not shown). As a result, the first 2 bits of information appearing at the terminal 78 are entered into the register stage 70*a*, the second 2 bits are entered into register 70*b*, etc. In essence, the entry of 2 bits in succession into a single register stage performs an "OR" operation with respect to those 2 bits. For example, if the first bit to be entered into register stage 70*a* is a "0" the flip-flop 80 will not change its state and a "0" second bit entered into the stage 70*a* will also not affect the state of the flip-flop 80, but a "1" second bit will change the state of the flip-flop 80. It can be readily appreciated that if the first bit of information entered into the register 70*a* is a "1", the polarity of the second bit will not affect the altered state of the flip-flop 80. Accordingly, the information supplied on the output lines 72 and 74 is compressed by a ratio of 32 to 1 with respect to the originally scanned information. Consequently, additional compression is required of this information.

As shown in FIG. 1, an output of the core memory 20 is connected to the reformat area 24 on the magnetic drum. This loop is employed during the full picture display mode of operation to permit a final compression of the data which is employed to construct a full picture display. The information supplied at the output lines 72 and 74 is transferred through the core memory 20 to the reformat area 24. During a first revolution of the magnetic drum, the information contained on the output lines 72 and 74 is derived from tracks 26, 28, 30 and 32 of the magnetic drum. In order to form the first line of the first field of the display, the information contained on tracks 38, 40, 42 and 44 must be combined with the previously sensed information. Therefore, during a second revolution of the magnetic drum, the information from block 36 is initially compressed by means of the circuit illustrated in FIG. 5 and the reformat register 70 and supplied through the core memory 20 to the reformat area 24. When the information derived from information block 36 is written into the reformat area 24, it is superimposed on the previously written information derived from the information contained in information block 34. Since only a "1" information bit is effective to cause a writing operation, any previously recorded "0" information bit will remain unchanged by the presence of a subsequent "0" bit and will be changed by the presence of a subsequent "1" information bit. However, any previously written "1" information bit will remain unchanged in the presence of any subsequent information bit of either polarity. As a result, an "OR" operation is performed during the second write operation within the reformat area 24. Once this information has been completely compressed within the reformat area 24, it is transferred through the data compression and reformat logic circuit 18 and the core memory 20 to the display storage unit 22.

It can be readily appreciated that the above described method of mapping information on a storage media permits rapid access and retrieval of such information for displaying either the whole or a submultiple of the whole of the scanned image. If it is desired to display a smaller than one-sixteenth picture, the distance between the beginning of the block 34 and the beginning of the block 36 can be reduced. For example, if it is desired to display a one sixty-fourth segment of the entire picture, the spacing between the beginning of block 34 and the beginning of block 36 will correspond to the distance occupied by the number of elements in one-eighth of a line segment. Although the information has been shown as arranged in 16-bit parallel format with 4-bit parallel per scan line, it is to be understood that the information blocks may be formatted in any convenient or desired arrangement. Furthermore, the information blocks may contain more or less than four scan lines of information.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention claimed is:

1. A method of mapping information on a movable storage media, wherein said information defines $n$ lines of $m$ elements per line of a scanned image for construction of at least one display therefrom which comprises $n/x$ lines of $m/y$ elements per line, wherein $x$ is equal to or greater than unity and equal to or less than $n$ and $y$ is equal to or greater than unity and equal to or less than $m$, comprising the steps of recording at least one line of said information along at least one track of the storage media, and recording a subsequent line of said information along another track of the storage media and spaced along the path of travel of the storage media from the beginning of the recording of said one line by a distance occupied by $m/y$ elements of information.

2. A method as defined in claim 1, wherein $x$ and $y$ are integral numbers.

3. A method as defined in claim 2, wherein $x$ is equal to $y$.

4. A method of mapping information on and retrieving information from a movable storage media, wherein said information comprises $n$ lines of $m$ elements per line of a scanned image, for construction of at least one display therefrom which comprises $h/x$ lines of $m/y$ elements per line, comprising the steps of recording at least one line of said information along at least one track of the storage media, recording a subsequent line of said information along another track of the storage media and spaced along the path of travel of the storage media from the beginning of the recording of said one line by a distance occupied by $m/y$ elements of information, sensing a plurality of elements from said one line, and compressing the data represented by said plurality of elements to form a display information bit.

5. A method as defined in claim 4, wherein the data is compressed by a factor which is inversely proportional to $x$.